(12) United States Patent
Kim

(10) Patent No.: US 10,490,828 B2
(45) Date of Patent: Nov. 26, 2019

(54) CARBON-PLATINUM CORE-SHELL TYPE CATALYSTS FOR FUEL CELLS AND METHOD FOR PREPARING THE SAME

(71) Applicants: HYUNDAI MOTOR COMPANY, Seoul (KR); KIA MOTORS CORPORATION, Seoul (KR)

(72) Inventor: Jun Tae Kim, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 85 days.

(21) Appl. No.: 15/808,253

(22) Filed: Nov. 9, 2017

(65) Prior Publication Data
US 2018/0309137 A1    Oct. 25, 2018

(30) Foreign Application Priority Data

Apr. 20, 2017  (KR) ........................ 10-2017-0050804

(51) Int. Cl.
*H01M 4/96* (2006.01)
*H01M 4/88* (2006.01)
(Continued)

(52) U.S. Cl.
CPC ............... *H01M 4/96* (2013.01); *B01J 23/42* (2013.01); *B01J 35/008* (2013.01); *B01J 35/0013* (2013.01); *B01J 35/0033* (2013.01); *B01J 35/023* (2013.01); *B01J 37/084* (2013.01); *B01J 37/343* (2013.01); *H01M 4/8657* (2013.01); *H01M 4/8825* (2013.01); *H01M 4/9083* (2013.01); *H01M 4/926* (2013.01); *H01M 2008/1095* (2013.01)

(58) Field of Classification Search
None
See application file for complete search history.

(56) References Cited

U.S. PATENT DOCUMENTS 9,101,915 B2     8/2015  Lopez et al.
2008/0087314 A1* 4/2008  Xiao ...................... H01L 35/16
                                                            136/201
2013/0288155 A1* 10/2013 Kim ...................... H01M 4/926
                                                            429/483

FOREIGN PATENT DOCUMENTS

JP    2015-227507 A    12/2015
KR    10-2011-0079668 A  7/2011
(Continued)

OTHER PUBLICATIONS

H. Hou, et al., "Carbon Quantum Dots and Their Derivative 3D Porous Carbon Frameworks for Sodium-Ion Batteries with Ultralong Cycle Live," Advanced Materials, 2015, pp. 1-13.
(Continued)

*Primary Examiner* — Wyatt P McConnell
(74) *Attorney, Agent, or Firm* — Morgan, Lewis & Bockius LLP

(57) ABSTRACT

A carbon-platinum core-shell type catalyst for fuel cells and a method for preparing the same which includes carbon as a core and platinum as a shell which can solve durability-associated problems under proton exchange membrane fuel cells (PEMFC) operation conditions and furthermore tackle manufacturing cost-related problems and process complexity by improving acid resistance through incorporation of a carbon material rather than a transition metal into catalysts.

5 Claims, 3 Drawing Sheets

(51) Int. Cl.
  *H01M 4/86* (2006.01)
  *H01M 4/90* (2006.01)
  *H01M 4/92* (2006.01)
  *B01J 37/08* (2006.01)
  *B01J 37/34* (2006.01)
  *B01J 23/42* (2006.01)
  *B01J 35/00* (2006.01)
  *B01J 35/02* (2006.01)
  *H01M 8/1018* (2016.01)

(56) References Cited

FOREIGN PATENT DOCUMENTS

KR  10-2013-0065932 A  6/2013
KR  10-2016-0038060 A  4/2016

OTHER PUBLICATIONS

H-S. Oh, et al., "Preparation of Pt/C catalyst using alcohol reduction and a polyol process in the presence of urea for oxygen reduction reaction," Res. Chem. Intermed., (2008), vol. 34, Nos. 8-9, pp. 853-861.

* cited by examiner

CARBON-PLATINUM CORE-SHELL TYPE CATALYSTS FOR FUEL CELLS AND METHOD FOR PREPARING THE SAME

CROSS-REFERENCE TO RELATED APPLICATION

This application claims, under 35 U.S.C. § 119(a), the benefit of priority to Korean Patent Application No. 10-2017-0050804 filed on Apr. 20, 2017, the entire contents of which are incorporated herein by reference.

BACKGROUND (a) Technical Field

The present disclosure relates to a carbon-platinum core-shell type catalyst for fuel cells and a method for preparing the same. More particularly, the present disclosure relates to a carbon-platinum core-shell type catalyst for fuel cells including carbon as a core and platinum as a shell which can solve durability-associated problems under PEMFC operation conditions and furthermore tackle manufacturing cost-related problems and process complexity by improving acid resistance through incorporation of a carbon material rather than a transition metal into catalysts and a method for preparing the same.

(b) Background Art

For several tens of years, nanometer-scale metal particles have been studied in a variety of application fields due to unique properties thereof. In particular, platinum has been used for a variety of catalytic reactions including fuel cells due to excellent surface activity, but has a great application restriction due to price and limited natural reserves.

Accordingly, in order to solve this problem, there is a need for development of catalysts for reducing platinum. The most potential method is to synthesize core-shell structured nanoparticles alloyed from platinum and a transition metal. This can reduce the amount of platinum. The prior art related to this includes:

(1) Korean Patent Laid-open No. 10-2016-0038060, (2) Carbon Quantum Dots and Their Derivative 3D Porous Carbon Frameworks for Sodium-Ion Batteries with Ultralong Cycle Life, Hongshuai Hou, Craig E. Banks, Mingjun Jing, Yan Zhang, and Xiaobo Ji, Advanced Materials, 27, 7861, 2015, and (3) Preparation of Pt/C catalyst using alcohol reduction and a polyol process in the presence of urea for oxygen reduction reaction, Hyunh-Suk Oh, Jong-Gil OH, Youn-Gi Hong, Raj Kishore Sharma, Yong-Gun Shul, and HanSung Kim, Research on Chemical Intermediates, 34,853, 2008.

However, disadvantageously, core-shell catalysts entail a complicated production process and have deteriorated cell performance caused by elution and dissociation of transition metals under PEMFC conditions including strong acidic conditions. Therefore, there were a variety of attempts to solve these problems.

However, the problems could not be fundamentally solved due to weak acid resistance of transition metal materials. Accordingly, there is a need to incorporate highly acid-resistant and inexpensive materials which can replace transition metals. Furthermore, there is an increasing need to tackle problems associated with manufacturing costs and complexity of the manufacturing process.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

Accordingly, the present inventors incorporated a carbon material which has relatively excellent acid resistance and is cheap, rather than a transition metal material having weak acid resistance and found that catalysts produced by supporting, on a carbon support, carbon-platinum nanoparticles obtained by coating carbon nanoparticles synthesized using a ketone compound such as acetone or pentanedione and a potassium hydroxide (KOH) solution with platinum nanoparticles can be produced at a low cost in a much easier manner as compared to conventional methods of producing core-shell type catalysts which are complicated and entail high costs. The catalyst produced by the present inventors exhibits superior electrochemical properties when compared to conventional high-durability catalysts, thus finally coming up with the present disclosure.

It is one object of the present disclosure to provide a carbon-platinum core-shell type catalyst for fuel cells.

In addition, it is another object of the present disclosure to provide a method of manufacturing a carbon-platinum core-shell type catalyst for fuel cells.

In one aspect, the present disclosure provides a carbon-platinum core-shell type catalyst for fuel cells as a catalyst supported on carbon for fuel cells, wherein the catalyst includes carbon as a core and platinum as a shell.

In another aspect, the present disclosure provides a method of manufacturing a carbon-platinum core-shell type catalyst for fuel cells including (a) mixing a ketone compound of acetone or pentanedione with a potassium hydroxide (KOH) solution and then inducing spontaneous polymerization to produce carbon nanoparticles, (b) adding the carbon nanoparticles to an ethylene glycol solution, dropwise adding a platinum precursor thereto and conducting reaction to produce core-shell structured carbon-platinum nanoparticles, and (c) dispersing a carbon support in an alcohol solvent, adding the core-shell structured carbon-platinum nanoparticles in the dispersion and conducting stirring to complete supporting the nanoparticles on the carbon support.

Other aspects and preferred embodiments of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
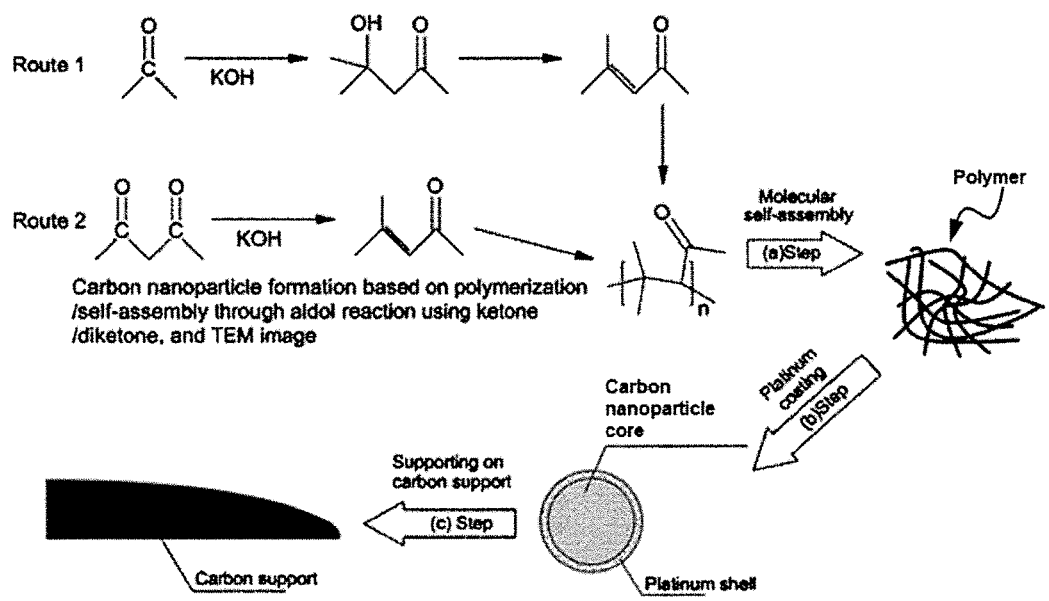
FIG. 1 shows a schematic view illustrating a method of manufacturing a carbon-platinum core-shell type catalyst according to the present disclosure.

Hereinafter, reference will be made in detail to various embodiments of the present disclosure, examples of which are illustrated in the accompanying drawings and described below. While the disclosure will be presented in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims. In the following description of the present disclosure, detailed descriptions of known functions and configurations incorporated herein will be omitted when it may obscure the subject matter of the present disclosure.

The present disclosure relates to a catalyst supported on carbon for fuel cells, and more specifically, a carbon-platinum core-shell type catalyst for fuel cells wherein the catalyst includes carbon as a core and platinum as a shell.

The catalyst according to the present disclosure is obtained by incorporating a carbon material which has relatively good acid resistance and is cheap, rather than a transition metal material having weak acid resistance. More specifically, the synthesized carbon nanoparticles are obtained by aldol reaction of a ketone compound of acetone or pentanedione with a potassium hydroxide (KOH) solution. This method has effects of shortening synthesis process time and reducing process cost due to easy control of particle size, as compared to a conventional synthesis method through aldol reaction using sodium hydroxide (NaOH) and acetone. In particular, the carbon nanoparticles synthesized according to the present disclosure exhibit excellent durability by incorporating carbon nanoparticles into a core and platinum into a shell.

Preferably, the carbon core according to the present disclosure is 10 to 12% by weight with respect to the total weight of the catalyst, and the platinum shell is 88 to 90% by weight with respect to the total weight of the catalyst. When the carbon content is less than 10% by weight, the catalyst particle size is reduced and it is difficult to achieve long-term durability. When the carbon content exceeds 12% by weight, there is a limit on securing an active area due to large catalyst particles. Thus, the carbon content is preferably within the range defined above. When the platinum content is less than 88% by weight, there is a limit on carbon core coating and when the platinum content exceeds 90% by weight, forming a core-shell structure is limited due to coagulation between platinum. Thus, the platinum content is preferably within the range defined above.

Furthermore, the catalyst preferably has an average particle size of 8 to 12 nm. When the average particle size is less than 8 nm, it is difficult to secure good durability due to catalyst particle coagulation and when the average particle size exceeds 12 nm, it is difficult to secure good performance due to reduced catalyst surface active area. Thus, the average particle size is preferably within the range defined above.

The catalyst obtained by supporting on the carbon support in the present disclosure exhibits improved durability, when applied to PEMFCs, and decreases costs for manufacturing fuel cells through reduction of the amount of platinum used, as compared to conventional transition metal-platinum core-shell type catalysts.

In addition, the method for manufacturing a catalyst according to the present disclosure includes the three steps shown in FIG. 1. More specifically, the present disclosure includes: (a) mixing a ketone compound of acetone or pentanedione with a potassium hydroxide (KOH) solution and then inducing spontaneous polymerization to produce carbon nanoparticles; (b) adding the carbon nanoparticles to an ethylene glycol solution and dropwise adding a platinum precursor to the resulting mixture and performing reaction to produce core-shell carbon-platinum nanoparticles; and (c) dispersing a carbon support in an alcohol solvent, adding the core-shell carbon-platinum nanoparticles to the dispersion and performing stirring to complete supporting. Hereinafter, respective steps will be described in detail.

First, step (a) is to synthesize carbon nanoparticles by mixing a ketone compound of acetone or pentanedione with a potassium hydroxide (KOH) solution and then inducing spontaneous polymerization/self-assembly.

When the potassium hydroxide (KOH) solution is used instead of conventionally used sodium hydroxide (NaOH), there are benefits of reducing reaction time and easily controlling reaction, since potassium hydroxide solubility is higher than sodium hydroxide solubility. Thus, it is preferable to use potassium hydroxide.

In addition, for the ketone compound as well, it is more preferable to use pentanedione than acetone in consideration of reduced process time, easy control of particle size and reduced costs.

Furthermore, in step (a), the ketone compound and the potassium hydroxide (KOH) solution are mixed in a weight ratio of 1:0.2 to 0.25 and are allowed to stand for 24 to 36 hours at 25 to 30° C. to induce spontaneous polymerization/self-assembly. Out of the ratio range, there is a limitation of formation of carbon particles due to formed unreacted product or by-product. Thus, the ketone compound and the potassium hydroxide (KOH) solution are used within the range defined above. The carbon nanoparticles thus synthesized are prepared by drying at 100 to 120° C. for 12 to 15 hours, then washing with water to remove impurities, and drying again.

Next, in step (b), the carbon nanoparticles prepared in step (a) are added to an ethylene glycol solution and homogeneously dispersed by sonication, and a platinum precursor is added dropwise to the dispersion, followed by reacting, to produce core-shell structured carbon-platinum nanoparticles.

In this case, the platinum precursor may be $PtCl_4$ or $H_2PtCl_6 6H_2O$, but the present disclosure is necessarily not limited thereto. In addition, with respect to 100 parts by weight of an ethylene glycol solution, 0.12 to 0.125 parts by weight of carbon nanoparticles and 0.164 to 0.173 parts by weight of the platinum precursor are preferably used. Out of the range defined above, there is a limitation of forming a core-shell structure due to insufficient coating of the carbon core with platinum or coagulation between platinum.

At this time, in step (b), reaction is carried out at 150 to 180° C. for 1 to 5 hours, and after reaction, the reaction solution is cooled to room temperature, filtered and washed with water to produce core-shell type nanoparticles including carbon as a core and platinum as a shell.

Finally, in step (c), the carbon support is homogeneously dispersed in an alcohol solvent by sonication, and the core-shell structured carbon-platinum s nanoparticles obtained in step (b) are added to the dispersion, followed by supporting with stirring, to produce a catalyst supported on a carbon support for fuel cells. In step (c), 100 parts by weight of the alcohol solvent and 0.075 to 0.085 parts by weight of the core-shell structured carbon-platinum nanoparticles are preferably used. At this time, the alcohol solution may be 2-propanol, but the present disclosure is not necessarily limited thereto.

Through this process, the catalyst is filtered using filter paper and washed with distilled water several times. The washing can be carried out several times using about 0.5L of distilled water. In addition, the catalyst is dried in an oven at 60 to 80° C. for 6 to 10 hours to completely evaporate water to finally produce a carbon-platinum core-shell type catalyst for fuel cells.

The manufacturing method according to the present disclosure is an improved method of synthesizing carbon nanoparticles which can shorten the process time and easily control particle size, thus reducing manufacturing costs. The catalyst thus produced can exhibit better durability than conventional transition metal-platinum core-shell catalysts, when applied to PEMFCs and can reduce the amount of platinum used, thus being highly useful for fuel cells and the like.

Hereinafter, the present disclosure will be described in more detail with reference to examples. However, these examples are provided only for illustration of the present disclosure and should not be construed as limiting the scope of the present disclosure.

EXAMPLE

Pentanedione and potassium hydroxide (KOH) were mixed in a weight ratio of 1:0.2, stirred for 30 minutes and allowed to stand at room temperature for one day or longer. Stirring was conducted until potassium hydroxide (KOH) was completely dissolved in ketone and allowed to stand to induce spontaneous polymerization. The synthesized carbon nanoparticles were dried in a vacuum oven at a temperature of 100° C. for 12 hours, washed with water to remove impurities and dried to produce carbon nanoparticles (step (a))

0.012 g of the synthesized carbon nanoparticles was added to 100 g of an ethylene glycol solution and homogeneously dispersed by sonication, and a predetermined amount of 0.173 g of a PtCl4 platinum precursor was added dropwise, reacted at a temperature of 160° C. for 3 hours, cooled to room temperature, filtered and washed with water to produce core-shell structured carbon-platinum nanoparticles (step (b)).

Finally, 0.1 g of a carbon support was added to 100 g of a 2-propanol solvent and homogeneously dispersed by sonication, and 0.08 g of the core-shell structured carbon-platinum nanoparticles were added thereto and supported by stirring at room temperature for 12 hours. After this process, the catalyst was filtered using filter paper and washed with distilled water several times. The washing can be carried out several times using about 0.5 L of distilled water. In addition, the catalyst was dried in an oven at 60° C. for 6 hours to completely evaporate water to produce a carbon-platinum core-shell type catalyst for fuel cells including 10% by weight of a carbon core and 90% by weight of a platinum shell.

Comparative Example 1

Conventional Platinum Catalyst Supported on Carbon

A PtFe core-shell catalyst (40% by weight of PtFe/C catalyst) known as a conventional highly durable alloy-based catalyst was prepared. At this time, the amount of platinum core supported was 10% by weight and the amount of iron shell supported was 90% by weight with respect to the total weight of the catalyst.

Comparative Example 2

Catalyst Produced by Conventional Production Method

The carbon nanoparticles were produced in the same manner as in Comparative Example 1, except that acetone and sodium hydroxide (NaOH) were used.

Test Example 1

TEM Measurement

Figure 2A:
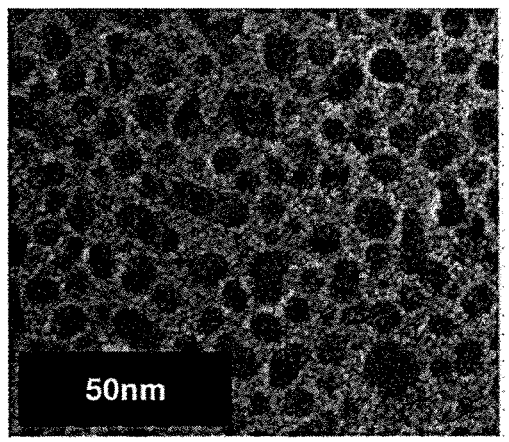
FIG. 2(a) shows the structure of carbon nanoparticles analyzed by transmission electron microscopy (TEM)
Figure 2B:
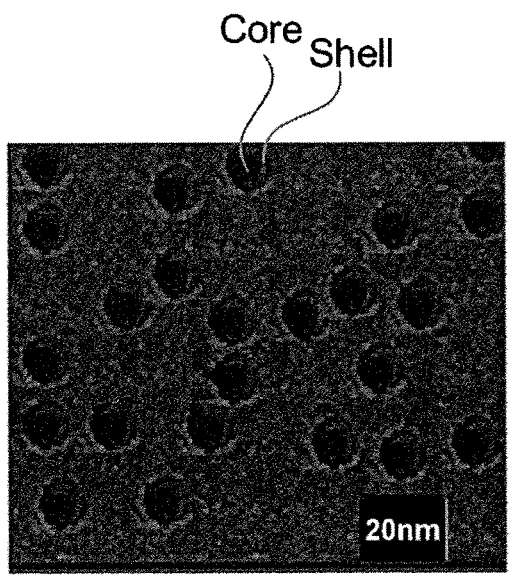
FIG. 2(b) shows the structure of carbon-platinum core-shell catalyst analyzed by transmission electron microscopy (TEM)

The structure of the catalyst of Example was analyzed using transmission electron microscopy (TEM). Referring to FIG. 2A, the carbon nanoparticles before supporting the platinum precursor had a size of about 5 to about 7 nm. Referring to FIG. 2B, the carbon-platinum core-shell type catalyst on which a platinum precursor is supported is core-shell particles having a size of about 10 nm. On the other hand, it could be seen that Comparative Example 2 had a particle size distribution of 10 to 12 nm.

Test Example 2

Evaluation of Electrochemical Oxygen Reduction Reaction Activity

Electrochemical oxygen reduction reaction (ORR) activity was evaluated for the catalysts of Example and Comparative Examples 1 and 2.

Specifically, in order to evaluate the electrochemical oxygen reduction reaction, a rotating disk electrode (RDE) was used. At this time, the area of the rotating disk electrode was 19.6 mm$^2$ and a method of loading the synthesized catalyst on an electrode is as follows. A powdery catalyst was dispersed in alcohol to prepare a catalyst ink, and the ink was then dropped on the rotating disk electrode and dried to evaporate the alcohol. Accordingly, only the powdery catalyst remains on the rotating disk electrode.

Furthermore, electrochemical properties were analyzed using a 3-electrode system, a saturated calomel electrode (SCE) electrode was used as a reference electrode and a platinum wire was used as a counter electrode. All analysis was carried out at room temperature.

Test conditions to acquire an oxygen reduction polarization curve are as follows. After an electrolyte solution was saturated with oxygen, oxygen was continuously supplied during analysis. The scan rate was 5 mV/s and the range was 0.05-1.0 V (vs. reversible hydrogen electrode (RHE)). Finally, the rotation rate of the electrode was maintained at 1600 revolutions per minute (RPM). As the half wave potential of the polarization curve increases, oxygen reduction reaction activity increases. Polarization curve results of the oxygen reduction reaction thus measured are shown in FIG. 3.

Figure 3:
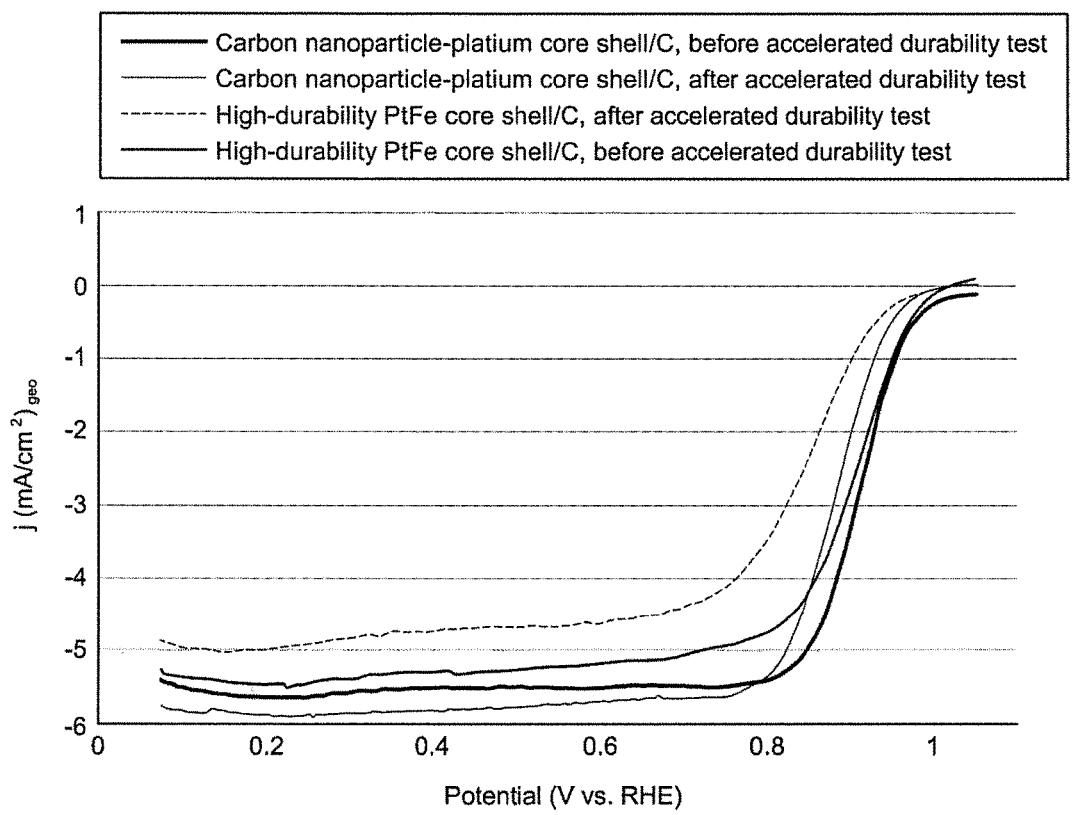
FIG. 3 shows an oxygen reduction polarization curve measured using a 3-electrode system to evaluate electrochemical oxygen reduction reaction activity of the catalysts produced in Example and Comparative Example.

FIG. 3 shows the difference between before and after accelerated durability test (1500 cycles). Regarding the catalyst of Example produced by the manufacturing is method according to the present disclosure, the half wave potential before the accelerated durability test was 907 mV. Meanwhile, the platinum-iron core-shell catalyst of Comparative Example 1 known as a high-durability catalyst, among fuel cell catalysts, had a half wave potential of 905 mV. Both catalysts exhibited similar activity. Furthermore, the catalyst of Comparative Example 2 exhibited a half wave potential of 900 mV.

However, the catalyst of Example produced by the manufacturing method according to the present disclosure had a half wave potential after accelerated durability test of about 902 mV which corresponds to an about only 0.55% decrease, while the platinum-iron core-shell catalyst of Comparative Example 1 had a half wave potential after accelerated durability test of 854 mV which corresponds to an about 5.6% decrease. This means about 10-fold deterioration in activity. Furthermore, the catalyst of Comparative Example 2 had a half wave potential of 998 mV which corresponds to an about 1.7% decrease.

In order words, the catalyst obtained by the manufacturing method according to the present disclosure exhibited similar initial ORR activity, but considerably excellent durability, as compared to conventional high-durability platinum-iron core-shell catalysts.

Accordingly, with the manufacturing method according to the present disclosure, it is possible to synthesize core-shell catalysts, which had been synthesized by a conventional complicated and costly method, in a much simpler manner at a low cost. The catalyst thus obtained exhibited considerably superior electrochemical properties compared to conventional highly durable catalysts.

As apparent from the foregoing, the catalyst according to the present disclosure exhibits improved durability and decreased fuel cell manufacturing costs through reduction of the amount of platinum used, when applied to PEMFCs, as compared to conventional transition metal-platinum core-shell type catalysts.

In addition, the method of manufacturing the catalyst according to the present disclosure utilizes potassium hydroxide (KOH) and a ketone compound such as pentanedione, unlike the conventional synthesis method (carbon nanoparticles are synthesized through aldol reaction using sodium hydroxide (NaOH) and acetone), thereby offering advantages of shortening synthesis process time, reducing process costs and controlling the size of catalyst particles.

The disclosure is presented in details with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of manufacturing a carbon-platinum core-shell type catalyst for fuel cells comprising:
    (a) mixing a ketone compound of acetone or pentanedione with a potassium hydroxide (KOH) solution and then inducing spontaneous polymerization to produce carbon nanoparticles;
    (b) adding the carbon nanoparticles produced in step (a) to an ethylene glycol solution, dropwise adding a platinum precursor thereto and conducting reaction to produce core-shell structured carbon-platinum nanoparticles; and
    (c) dispersing a carbon support in an alcohol solvent, adding the core-shell structured carbon-platinum nanoparticles in the dispersion and conducting stirring.

2. The method according to claim 1, wherein, in step (a), the spontaneous polymerization is carried out by mixing the ketone compound with the potassium hydroxide (KOH) solution in a weight ratio of 1:0.2 to 1:0.25 and allowing to stand for 24 to 36 hours at 25 to 30° C. to induce spontaneous polymerization.

3. The method according to claim 1, wherein, in step (b), 0.12 to 0.125 parts by weight of the carbon nanoparticles and 0.164 to 0.173 parts by weight of the platinum precursor are used, with respect to 100 parts by weight of the ethylene glycol solution.

4. The method according to claim 1, wherein, in step (b), the reaction is carried out at 150 to 180° C. for 1 to 5 hours.

5. The method according to claim 1, wherein, in step (c), 0.075 to 0.085 parts by weight of the core-shell structured carbon-platinum nanoparticles is used, with respect to 100 parts by weight of the alcohol solvent.

* * * * *